UNITED STATES PATENT OFFICE.

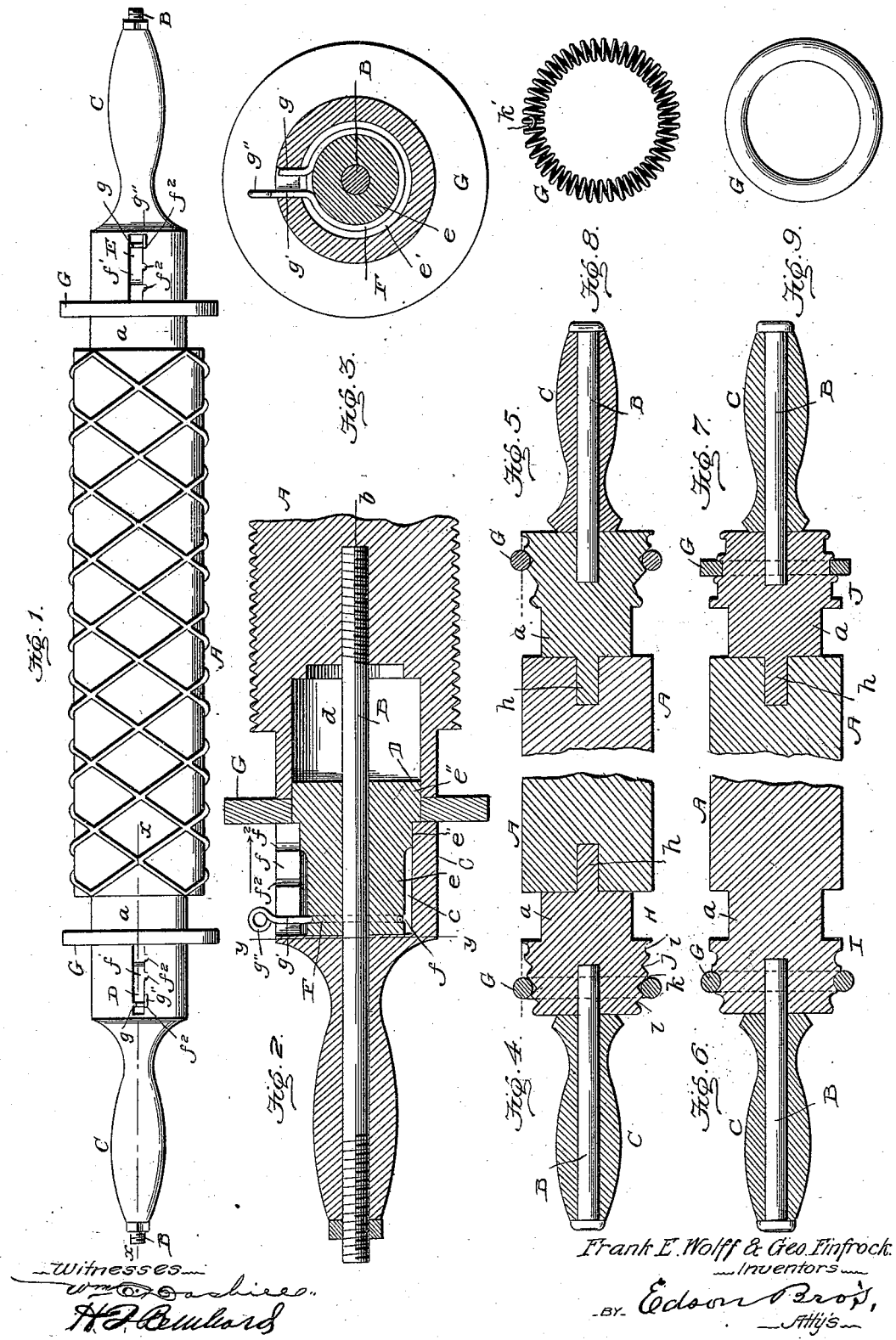

FRANK E. WOLFF AND GEORGE FINFROCK, OF CHICAGO, ILLINOIS.

ROLLING-PIN.

SPECIFICATION forming part of Letters Patent No. 550,337, dated November 26, 1895.

Application filed March 28, 1895. Serial No. 543,571. (No model.)

*To all whom it may concern:*

Be it known that we, FRANK E. WOLFF and GEORGE FINFROCK, citizens of the United States, residing at Chicago, in the county of Cook and State of Illinois, have invented certain new and useful Improvements in Rolling-Pins; and we do hereby declare the following to be a full, clear, and exact description of the invention, such as will enable others skilled in the art to which it appertains to make and use the same.

Our invention relates to improvements in rolling-pins of the kind shown and described in United States Letters Patent No. 534,460, issued to us on the 19th day of February, 1895.

We provide an improved construction of rolling-pin by which with one adjustment a sheet of dough may be rolled to one uniform thickness and with other adjustments sheets of dough may be rolled uniformly to different thicknesses.

To the accomplishment of these ends our invention consists in providing tapered journals or collars on the rolling-pin and combining therewith adjustable gage devices which can be moved on the tapered journals or collars to adapt the pin for rolling different thicknesses of dough.

The invention further consists in the construction and combination of parts, which will be hereinafter fully described and claimed.

To enable others to understand our invention we have illustrated the same in various embodiments in the accompanying drawings, forming a part of this specification, in which—

Figure 1 is an elevation of one embodiment of our invention; Fig. 2, a longitudinal sectional view on the plane indicated by the dotted line *x x* of Fig. 1, and Fig. 3 a vertical transverse sectional view on the line *y y* of Fig. 2. Figs. 4 to 7, inclusive, are enlarged detail views of other constructions embodying our invention; and Figs. 8 and 9 are detail views of the expansible gages, which may be used in either of the constructions shown by Figs. 4 to 7.

Like letters of reference denote like parts in all the figures.

The cylindrical body A of the rolling-pin has its ends reduced to form the necks *a a*, and said cylindrical body A has the axial bores or openings *b b* provided therein for the reception of the spindles B B, on which are sleeved the loose handles C C. Thus far the rolling-pin is similar to our patented structure; but the improvements consist in the new gage devices whereby the cylindrical body may be sustained at different elevations above the rolling-board or other surface to roll sheets of dough to different thicknesses, each sheet being of one uniform thickness.

The leading feature of our improvements consist in the provision of a graduated journal between the sleeved handle and end of the cylindrical body, in combination with a gage wheel or ring, which is adapted to fit any one of the graduations of the journal and to sustain the body A at different distances from the rolling surface or board.

In the embodiment of our invention shown by Figs. 1 to 3, inclusive, we make the graduated journals D E adjustable toward or away from one another and within the sleeved handles C C and cylindrical body A.

Each neck *a* and end of the cylindrical body is hollowed out to form the chamber *d*, and the inner end of the handle C is enlarged and hollowed to form the chamber *c*. The handle C is so arranged with relation to the cylindrical body A and held in such position by the spindle B that the chambers *c d* register to accommodate the adjustable graduated journal D or E, as the case may be. The journal which we use in this embodiment is bored out to loosely fit on the spindle B to enable the journal to be moved longitudinally with respect to the handle C and body A, and this journal is housed or inclosed partially within the chambers of the handle and sleeve. The slidable journal is turned to conical shape to produce the graduated collars *e e' e''*, of which the collar *e* is smaller than the collar *e'* and the collar *e''* is larger than either the collars *e* or *e'*, and the end of the journal which is fitted in the enlarged chambered end of the handle is provided with an annular channel or groove *f*, for a purpose to be explained.

G G are the gage-wheels, which are fitted on two of the graduated collars of the adjustable journals D E, and in this embodiment of our invention we prefer to make the gage-wheels of rigid material, either of wood, metal, or other material, and to form circular openings therein equal in diameter to the collar $e''$ of largest diameter on the graduated journal.

To provide for the convenient adjustment of the graduated journal, which, it will be noted, is housed within the handle and cylindrical body, and to confine or lock the journal to its properly-adjusted position, we adopt the following construction: A radial slot $f'$ is cut in the enlarged end of the handle and opens into the chamber $c$ throughout the length of the latter. In one of the walls of this slot a series of notches $f^2$ is produced, which are spaced apart equal to the width of the graduated collars on the journal, the other wall of the slot being preferably left smooth. A spring-retainer F is bent to fit in the groove $f$ of the graduated journal, and this spring-retainer has two arms $g$ $g'$, the short arm $g$ being arranged to bear against the smooth wall of the slot $f'$, while the longer arm $g'$ is adapted to spring into any one of the notches $f^2$, the protruding end of said long arm having a finger-piece $g''$, by which it may be conveniently grasped and operated.

The handle C is adapted to slide on the spindle B, or the spindle B may be adjusted longitudinally in the body A when the graduated journal D or E is moved. If the handle C is to be adjusted on the spindle, the latter may be fastened in the body A and its outer end provided with an adjustable nut, or the spindle may be provided with a headed outer end and with a threaded inner end to enable the spindle to be screwed into the axial bore of the body A and be thereby adjusted longitudinally therein.

If it is desired to roll a sheet of dough of considerable thickness, the spring-retainers F are adjusted to bring the arms $g'$ into the first of the notches $f^2$ and retract the journals D E within the handle C to leave the collars $e''$ $e'$ between the handles and necks $a$ $a'$ of the body A, on which collars $e''$ are fitted the gage-wheels G G. This adjustment of the graduated journals and gage-wheels causes the wheels to raise the cylindrical body A a suitable distance above the board or other surface to roll out a sheet of dough uniform in thickness. The retainers F are so adjusted that their arms $g'$ can be thrown out of the first notches and moved lengthwise in the slots $f$ toward the ends of the body A, thereby adjusting the journals D E toward each other and partially within the chambers $d$ in the ends of the body A and the necks $a$ $a$ thereof. This adjustment of the graduated journals D E brings the collars $e$ or $e'$ between the inner enlarged ends of the handles C and necks $a$, and the collars $e$ or $e'$ of the journals are thus fitted loosely in the gage-wheels, according to the adjustment of the graduated journals, whereby the cylindrical body A will be lowered toward the board or surface for a distance equal to the difference between the collars of different diameter forming the graduated journals.

When the graduated journals are adjusted to cause either of the smaller collars $e$ or $e'$ thereof to fit inside of the gage-wheels, these wheels ride loosely upon the journals, but are prevented from having lateral motion or wabbling by the rolling-pin body and the enlarged ends of the handles.

It will thus be seen that we provide an improved rolling-pin in which the cylindrical body can be held at one elevation to roll out a uniform sheet of dough of one thickness and that the distance between the board and cylindrical body A can be varied to roll out uniformly one or more sheets of dough of a different thickness or thicknesses. The means whereby this adjustment is effected are simple and efficient and they are easily adjusted to suit the conditions under which the rolling-pin may be operated.

In the embodiments of our invention shown by Figs. 4 to 9, inclusive, we dispense with the retainers F and avoid the use of a slidable journal, although we retain the essential feature of the graduated journals and the gage-wheels or rings adapted to the graduated collars on the journals.

In Fig. 4 we show the graduated journal H made separate from the cylindrical body and said journal is fastened to the body, as by a tenon $h$, fixed in the axial bore or socket in the body. The inner end of the journal is turned down to form the neck $a$ and the periphery of the journal is tapered by forming a series of grooves or channels $i j k l$, although the number of grooves is not material. In Fig. 4 the collar or groove $i$, of large diameter, is next to the end of the body A and the smallest collar or groove $l$ is at the outer ends of the journal H, next to the spindle and handle; but in Fig. 5 we have reversed the order of arrangement of the collars or grooves on the tapered graduated journal by making the smaller collar at the inner end of the journal next to the body A, while the larger collar is at the outer end of the journal next to the spindle and handle, as will be readily understood by reference to said Figs. 4 and 5.

In Fig. 6 we have shown the body A and graduated tapered or conical journal I as being made in a single piece. The space between the cylindrical body A and the inner end of the graduated journal I', which spaces the body and journal, is to prevent the dough from clogging the journal and gage-wheel or ring, and in said Fig. 6 the graduated journal has grooves or channels of varying diameter produced therein to accommodate the gage-wheel or ring.

In Fig. 7 we have shown the graduated journal J as provided with grooves or channels which are rectangular in cross-section to accommodate gage-wheels somewhat similar to the wheels G used in the type of journal shown by Figs. 1, 2, and 3, although the type of gage-wheel used with the journal J of Fig. 7 is made expansible to fit the different diameters of collars or grooves.

The tapered journals shown by Figs. 4, 5, and 6 are designed for use in connection with contractible elastic gage wheels or rings of the character shown by Figs. 8 and 9. In Fig. 8 the gage wheel or ring is made of wire of suitable thickness, which is coiled into a helical spring of approximately cylindrical contour, and this spring is then bent around a suitable former or mandrel into annular or ring-like form, the two ends of the ring being hooked together, as at $k$, or otherwise connected together. This construction provides a ring-like gage which may be slipped over the graduated journal, and as the ring-shaped gage is elastic it will closely hug or fit to either of the graduated collars of the journal.

The journal and gage are so proportioned that the outer perimeter of the gage projects beyond the cylindrical surface of the body A, and the gages on the two journals at the ends of the cylindrical body are thus adapted to ride upon the rolling-board or other surface to elevate the cylindrical body at the desired height above the board according to the thickness of the sheet of dough it is desired to roll out.

In Fig. 9 the gage-ring is made of rubber to render it elastic and contractible, and in cross-section this ring conforms to the shape of the grooves or channels in the graduated collars or the journal.

The surface of the cylindrical body may be given any desired configuration or pattern. In Fig. 1 we have shown the body A as having a pattern of diamond-shaped figures, and in Fig. 2 the body has a corrugated periphery or surface, but it is evident that other patterns can be worked in the surface of the body A.

It is thought that the operation and advantages of our improved rolling-pin will be readily understood and appreciated by those skilled in the art from the foregoing description, taken in connection with the drawings.

We are aware that changes in the form and proportion of parts and in the details of construction of the devices herein shown and described as embodiments of our invention may be made by a skilled mechanic without departing from the spirit or sacrificing the advantages of our invention—as, for instance, the position of the adjustable journals may be reversed from that shown in Fig. 2 to bring the larger end of the journal within the handle. We therefore reserve the right to make such modifications as fairly fall within the scope of our invention.

Having thus fully described our invention, what we claim as new, and desire to secure by Letters Patent, is—

1. The combination with a rolling pin, of a graduated journal, and a gage wheel or ring fitted to the graduated journal, substantially as and for the purposes described.

2. The combination with a rolling pin, of conical or tapered, graduated journals at the ends of the body, and gages applied to corresponding graduations of the journals and adapted to be fitted to other graduations of said journals, for the purposes described, substantially as set forth.

3. The combination with a cylindrical body, of the spindles, the handles sleeved thereon, the graduated conical journals between said body and the handles, and gage wheels or rings fitted to the graduated journals, substantially as and for the purposes described.

4. The combination with a cylindrical body and a handle, of an adjustable graduated journal, and a gage wheel or ring, substantially as described.

5. The combination with a cylindrical body, and a handle of a slidable graduated journal, a gage wheel, and a locking device for holding the journal in position, substantially as and for the purposes described.

6. The combination with a cylindrical body, a spindle, and a handle, of an adjustable graduated journal slidably fitted to the spindle between the handle and body, a gage wheel or ring, and a locking contrivance for holding the graduated journal to the handle, substantially as described.

7. The combination with a body, and a spindle, of a slotted recessed handle, a graduated journal slidable on the spindle, a gage wheel, and a spring locking device engaging with the journal and with the slotted handle, substantially as and for the purposes described.

8. The combination with a body and a spindle of a handle having the slot $f$ and notches $f^2$, the graduated journal, a gage wheel, and a spring retainer which is connected with the journal and provided with an arm $g'$ which is adapted to the notches $f^2$, substantially as and for the purposes described.

In testimony whereof we affix our signatures in presence of two witnesses.

FRANK E. WOLFF,
GEORGE FINFROCK.

Witnesses:
JAMES BARRY,
WILLIAM E. EWALD.